UNITED STATES PATENT OFFICE.

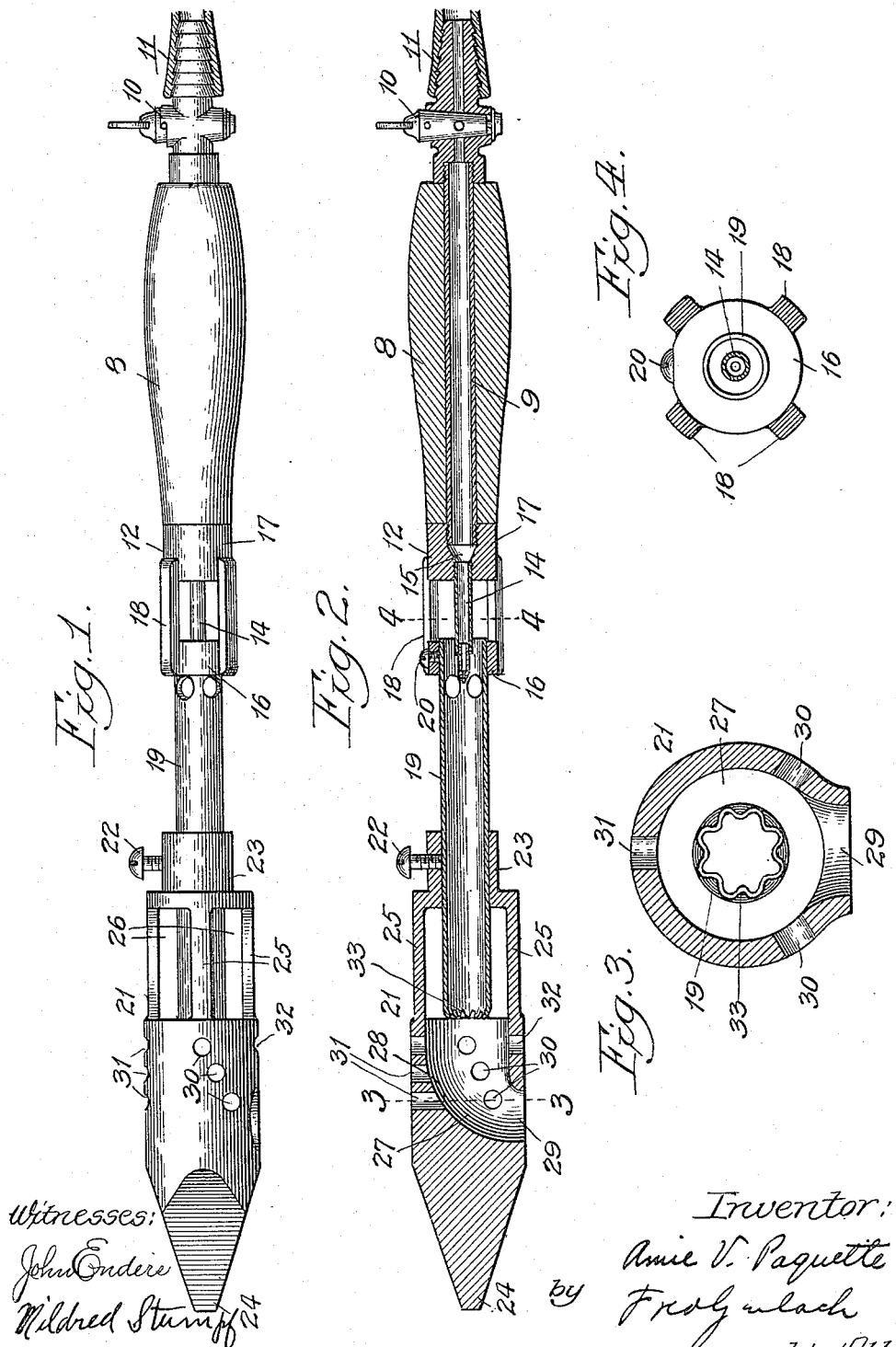

AMIE V. PAQUETTE, OF CHICAGO, ILLINOIS, ASSIGNOR TO L. B. ALLEN CO., OF CHICAGO, ILLINOIS, A CORPORATION OF ILLINOIS.

SOLDERING-IRON.

1,165,897.  Specification of Letters Patent.  Patented Dec. 28, 1915.

Application filed August 6, 1914. Serial No. 355,355.

*To all whom it may concern:*

Be it known that I, AMIE V. PAQUETTE, a resident of Chicago, in the county of Cook and State of Illinois, have invented certain new and useful Improvements in Soldering-Irons, of which the following is a full, clear, and exact description.

The invention relates to self-heating soldering irons.

One object of the invention is to provide an improved soldering iron by which heat from the flame, besides being utilized to keep the soldering point hot, will be deflected onto the work so that the latter will be thoroughly heated in advance of the application of the soldering point. By thus utilizing the heat, the work will be thoroughly heated in advance of the application of the soldering iron and thereby an effective uniform heat will result between the solder and the work, because the solder will more readily adhere to a heated surface than an unheated surface. By thus preheating the work, the soldering operation will be greatly facilitated, because it will not be necessary to work the point of the iron back and forth over the solder.

The invention further designs to provide an improved self heating soldering iron.

The invention consists in the several novel features hereinafter set forth and more particularly defined by claims at the conclusion hereof.

In the drawings: Figure 1 is a side elevation of a soldering iron embodying the invention. Fig. 2 is a longitudinal section. Fig. 3 is a section taken on line 3—3 of Fig. 2. Fig. 4 is a longitudinal section taken on line 4—4 of Fig. 2.

The improved soldering iron comprises a handle 8, usually made of wood, a gas-pipe 9, extending longitudinally through the handle, a shut-off cock 10 connected to one end of pipe 9 and adapted to be connected to a flexible tube 11 from a suitable source of gas supply, and a coupling member 12, which is secured by screw-thread to one end of pipe 9. A nozzle 14 is secured to the coupling 12, an opening 15 being formed through said member to conduct gas from pipe 9 to said nozzle. Coupling 12 comprises a ring 16, a ring 17, in which opening 15 is formed and longitudinally extending connecting ribs 18 between said rings. A mixing-tube 19 is secured in ring 16 by a screw 20. Nozzle 14 is smaller in cross-sectional area than tube 19 and extends entirely across the opening between rings 16 and 17 though which air enters the mixing tube and around the nozzle. By thus extending the nozzle entirely across the opening between the rings and into the mixing-tube, the gas delivered into the mixing-tube draws the air into said tube through the space between the nozzle and the mixing-tube.

A soldering head 21 is adjustably secured by a screw 22 on the mixing tube 19. This head comprises a ring 23 at one end fitting on the mixing tube and through which screw 22 extends, the soldering point 24 at the other end and ribs 25 connecting the point and said ring, spaces 26 being formed between the ribs. The soldering head is hollow back of the point, being formed with a chamber 27, so that the flame and heat will pass into the head back of the point and will heat the latter. The upper portion of chamber 27 is curved as at 28 and leads downwardly to the lower portion of the head. A series of air inlets 30 is formed at each side of chamber 27 and a series of air inlets 31 is formed at the top of said chamber. An air inlet 32 is formed in the bottom of the head.

The discharge-terminal of mixing tube 19 is formed with inwardly and forwardly extending tongues 33, which serve to further mix the air and gas before reaching the combustion point and tend to direct the flame into chamber 27 without materially retarding the flow of mixed air and gas.

In operation, the flame in the head and the heat therefrom will be directed against the curved surface 28 of chamber 27 and will be then deflected and conducted downwardly through the opening 29, which will be immediately over the work in advance of the point where the soldering point is applied to the work, because the working stroke of the soldering iron is usually toward the operator. By providing a soldering head in which provision is made for admitting air into the chamber therein to promote combustion and directing the products of combustion against the back of the point to heat it and then downwardly to the work in advance of the point, the work is preheated before the soldering point is applied thereto. This preheating facilitates the soldering operation and insures an effective joint. If the operator should operate the iron with a push stroke, the heat discharged from duct 29 will heat the work and solder as the point is moved over the work. If at any time it is desired to heat the work, the iron may be turned to direct the heat from duct 29 upwardly. By adjusting the head on the mixing tube to bring the back of the point nearer or farther from the flame, the heating of the head may be regulated.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a soldering iron, the combination of a handle, a gas supply connection thereon, a pipe connected to the handle, a mixing tube connected to receive gas from said pipe, and a soldering head having a soldering point at its outer end and having a single large angular duct extending from the back of the head to one side thereof for conducting heat from the back of the point downwardly to heat the work when the point is drawn over it, and smaller air inlets in the head leading to said angular duct adjacent its outlet.

2. In a soldering-iron, the combination of a handle, a gas-supply connection thereon, a mixing tube connected to receive gas from said supply, a soldering head comprising a soldering point at its outer end, a ring secured on the mixing tube and ribs between the point and said ring, the soldering head having a chamber therein and having a duct leading from said chamber to one side of the head to conduct heat downwardly to the work as the point is drawn over it, the head having air openings leading to said chamber.

AMIE V. PAQUETTE.

Witnesses:
 MILDRED STUMPF,
 KATHARINE GERLACH.

Copies of this patent may be obtained for five cents each, by addressing the "Commissioner of Patents, Washington, D. C."